M. J. ACTON.
BROACHING MACHINE ATTACHMENT FOR SPLITTING PISTON RINGS.
APPLICATION FILED MAY 2, 1918.
1,291,700. Patented Jan. 21, 1919.
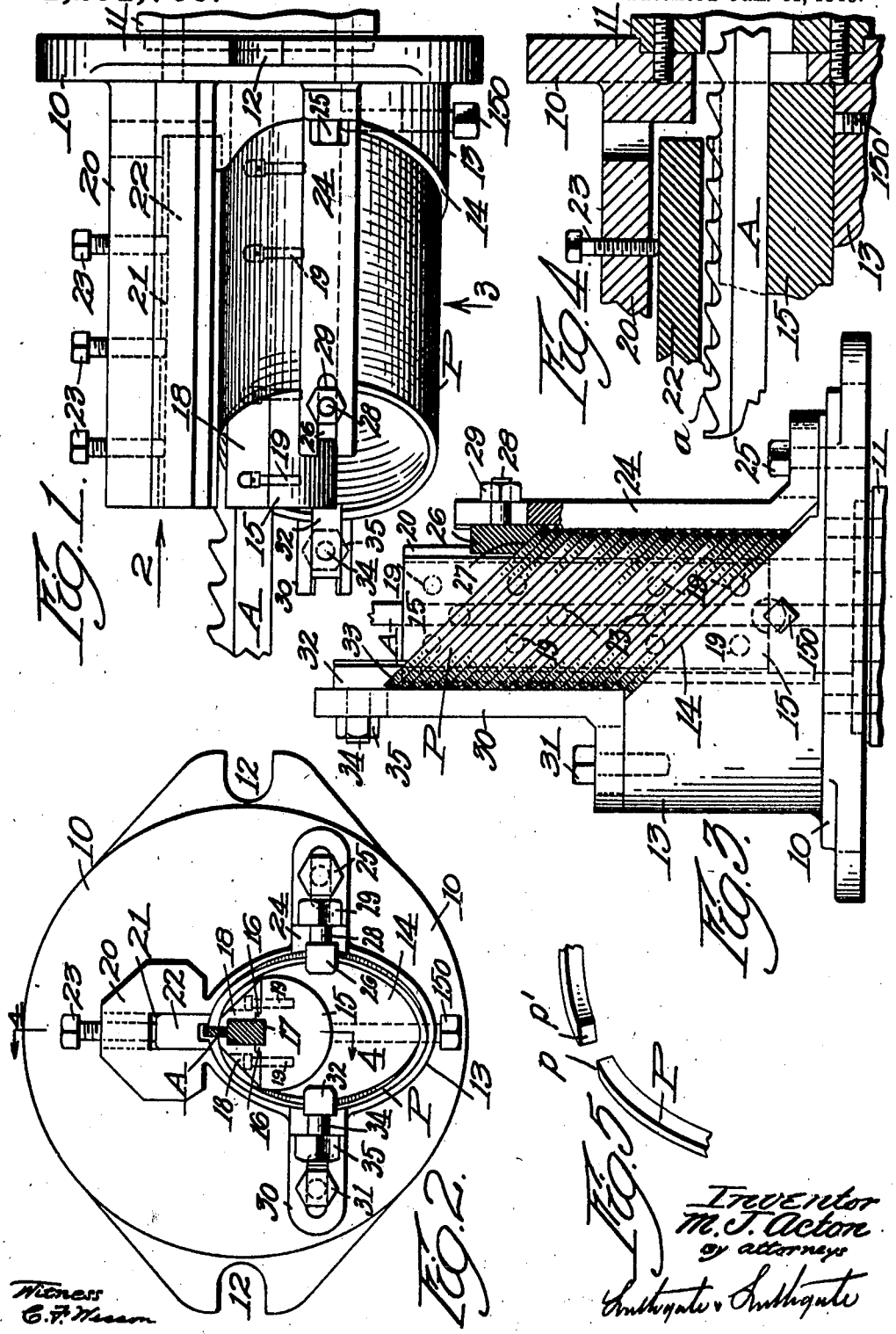

UNITED STATES PATENT OFFICE.

MICHAEL J. ACTON, OF FRAMINGHAM, MASSACHUSETTS, ASSIGNOR TO LAPOINTE MACHINE TOOL COMPANY, OF HUDSON, MASSACHUSETTS, A CORPORATION OF MASSACHUSETTS.

BROACHING-MACHINE ATTACHMENT FOR SPLITTING PISTON-RINGS.

1,291,700.

Specification of Letters Patent.    Patented Jan. 21, 1919.

Application filed May 2, 1918. Serial No. 232,129.

*To all whom it may concern:*

Be it known that I, MICHAEL J. ACTON, a citizen of the United States, residing at Framingham, in the county of Middlesex and State of Massachusetts, have invented a new and useful Broaching-Machine Attachment for Splitting Piston-Rings, of which the following is a specification.

The object of this invention is to provide a new and improved attachment by which piston rings can be split with an oblique cut. The attachment is designed to go on a broaching machine of ordinary or approved form, such as is shown for example in my companion application filed on even date herewith, Serial No. 232,130.

The attachment is illustrated in the accompanying drawing, referring to which—

Figure 1 is a side elevation of my attachment;

Fig. 2 is an end elevation;

Fig. 3 is a bottom plan view, partly in section, of the parts shown in Fig. 1;

Fig. 4 is a sectional elevation taken on the line 4—4 of Fig. 2, and

Fig. 5 is a detail perspective of one of the split piston rings.

Referring to the drawings, and in detail, the attachment consists of a circular base 10 having a bushing 11, which is adapted to fit into the hole in the face plate of the broaching machine. The base is provided with notches 12—12 for receiving clamping screws so that the attachment can be firmly held in position.

Extending from the base 10 is a block 13 which is faced off at 14 at the angle which it is desired the cut through the piston ring shall bear to the plane faces thereof. Extending from the base 10 and fitted in the block 13 is a partial circular cutter supporting hub 15 which is secured in position by a screw 150. The hob 15 has an upwardly extending tenon 16 and a groove 17. Secured on top of the hub 15 are two triangular sectioned or cut-away caps 18 which are held in position on the hub 15 by screws 19. The cutter bar or broaching tool A which has extending cutting or saw teeth *a* is adapted to fit into the groove 17 and the caps 18—18 are shaped to hold the cutter bar in position. The piston rings P rest on top of the trianglar caps 18 and may be clamped in position at the proper angle to the travel of the broaching tool A by reason of the shape of said caps.

Extending from the base 10 is a projection 20, which has a groove 21, fitted in which is a clamping block 22 having a groove in which the teeth of the cutter A can work. The clamping block is adjusted by means of screws 23 threaded into the projection 20.

A positioning or supporting piece 24 is adjustably secured to the base 10 by a screw 25 fitting in a slot in the foot of the piece 24. A clamping piece 26 is fitted in a groove on the inside face of the supporting piece 24, which clamping piece has an inclined engaging surface 27 corresponding to the angle which the piston rings are to occupy. The clamping piece has a screw 28 extending through a notch in the supporting piece 24 and is provided with a nut 29 on its end.

A supporting piece 30 is adjustably secured to the block 13 by means of a screw 31 fitting in a slot in its foot. A clamping piece 32 having an angular engaging face 33 shaped to engage the piston rings is fitted in a groove in the top of the supporting piece 30 and is held in place by a screw 34 extending through a notch in the supporting piece 30 and having a nut 35 on its end.

The operation is as follows: The supporting or clamping pieces 24 and 30 are moved outwardly or away from the hub 15 by loosening screws 25 and 31, and the clamping pieces 26 and 32 are removed. A bunch of piston rings P is then slid in position on the triangular caps 18—18 until the innermost ring engages the angular face 14 of the block 13. The clamping or supporting pieces 24 and 30 are then brought tightly against the piston rings, and screws 25 and 31 tightened, and the clamping pieces 26 and 32 are then adjusted to engage the piston rings, and nuts 29 and 35 tightened, and the clamping block 22 is also adjusted down tightly on the piston rings. This will hold the bunch of piston rings tightly at the desired angle.

The machine is then started in operation, and the broaching tool is drawn forward through the attachment, severing the piston rings with a kerf or cut which will give two angular opposing faces *p* and *p'* as illustrated in Fig. 5.

It will be noted that when the piston rings are clamped in position, their central points will come in a straight line and the plane faces of the rings will be inclined relatively to this straight line. It also will be noted that the cutter supporting and guiding means is arranged so that the cutter will be constrained to move through the piston rings on a line parallel with said straight line. In detail, this relative arrangement is obtained by the block, the hub extending therefrom constructed to support and guide the cutter in a straight line, the block being inclined or faced off at an angle relatively to said line, and by the means for clamping the plurality of piston rings on said hub against the inclined face of said block.

By the attachment described, a great deal of work can be rapidly turned out as a large number of piston rings can be severed on an inclined cut at one operation. The attachment can be adjusted to hold rings which are considerably larger or smaller in diameter than those illustrated.

The details and arrangements herein shown and described may be greatly varied by a skilled mechanic without departing from the scope of my invention as expressed in the claim.

Having thus described my invention, what I claim and desire to secure by Letters Patent is—

1. A broaching machine attachment comprising means for holding a plurality of piston rings so that their central points will be in a straight line and so that the plane faces of said rings will be inclined relatively to said line, and means for supporting and guiding a cutter so that it can be drawn through said plurality of rings on a line parallel with said straight line to split the rings obliquely.

2. A broaching machine attachment comprising a supporting hub having means for clamping a plurality of piston rings thereon so that their central points will be in a straight line and so that the plane faces of said rings will be inclined relatively to said line, said hub being formed and constructed to support and guide a cutter so that it can be drawn through said plurality of rings on a line parallel with said straight line to split the rings obliquely.

3. A broaching machine attachment comprising a block, a hub extending therefrom and constructed to support and guide a cutter in a straight line, said block being inclined or faced off at an angle relatively to said line, and means for clamping a plurality of piston rings on said hub and against the inclined face of said block.

4. A broaching machine attachment comprising a block, a hub extending therefrom, caps on said hub, the hub and caps being arranged and constructed to support and guide a cutter in a straight line, said block being inclined or faced off at an angle relatively to said line, and means for clamping a plurality of piston rings on said hub and against the inclined face of said block.

5. A broaching machine attachment comprising a block, a hub extending therefrom and constructed to support and guide a cutter in a straight line, said block being inclined or faced off at an angle relatively to said line, and adjustable supporting pieces on said block carrying clamping pieces having angular faces arranged to clamp and secure a plurality of piston rings in position on the hub and against the angular face of the block.

6. A broaching machine attachment comprising a block, a hub extending therefrom, caps secured to said hub, the hub and caps being constructed to support and guide a cutter in a straight line and said caps being cut away so that a plurality of piston rings can be placed thereon at an angle to the travel of the cutter, and means for clamping and holding the piston rings in place on the hub caps so that their central points will be in a straight line and so that the plane faces of said rings will be inclined relatively to said line.

7. A broaching machine attachment comprising a block, a hub extending therefrom, cut-away caps secured to the top of said hub, the hub and caps being constructed to support and guide a cutter in a straight line, said block being inclined or faced off at an angle relatively to said line, adjustable supporting pieces having clamping pieces with angular faces coöperating therewith, and an extending projection having a grooved clamping block arranged above the cutter supporting hub.

In testimony whereof I have hereunto affixed my signature.

MICHAEL J. ACTON.